UNITED STATES PATENT OFFICE.

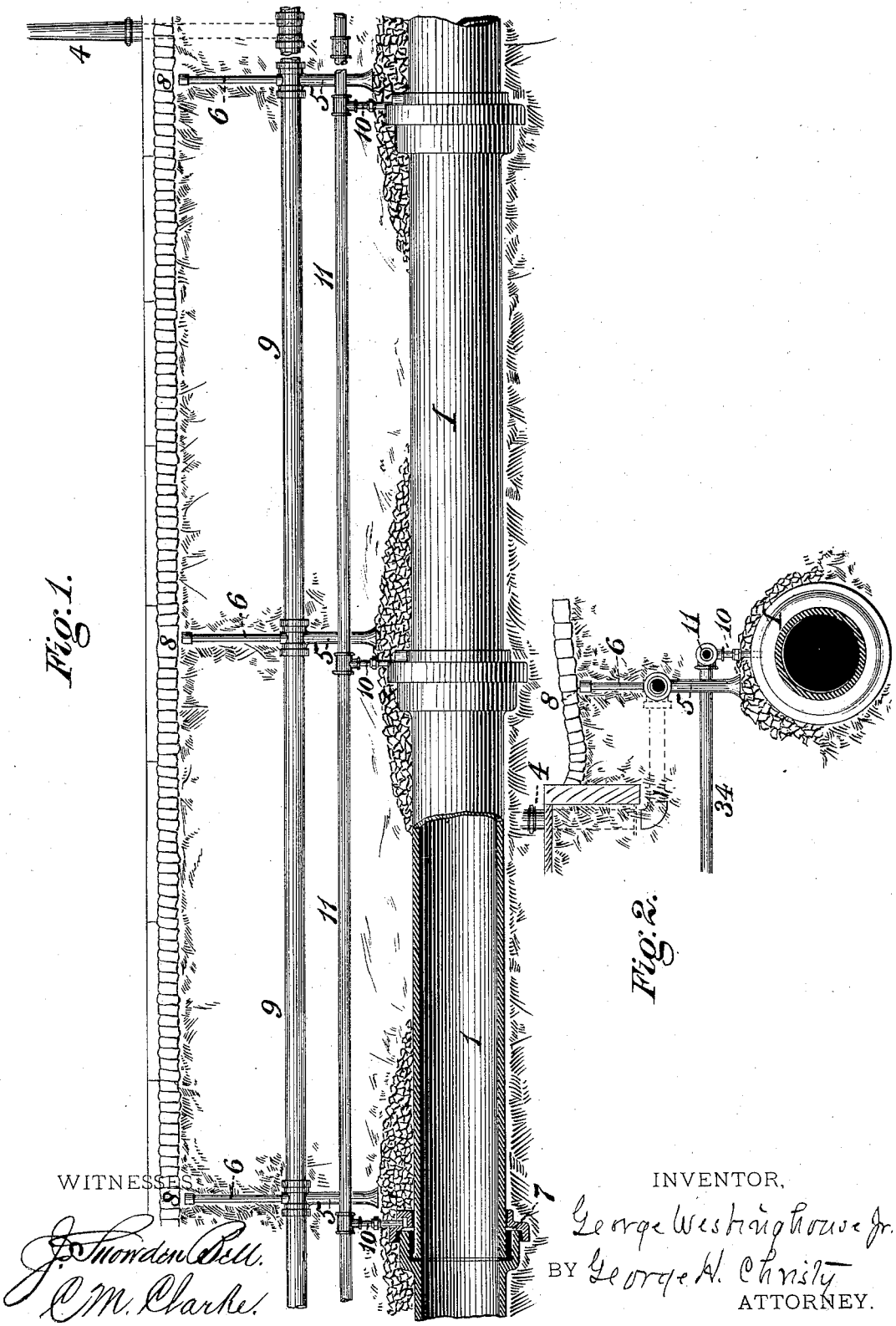

GEORGE WESTINGHOUSE, JR., OF PITTSBURG, PENNSYLVANIA.

MEANS FOR DETECTING AND CARRYING OFF LEAKAGE FROM GAS-MAINS.

SPECIFICATION forming part of Letters Patent No. 331,595, dated December 1, 1885.

Application filed November 2, 1885. Serial No. 181,581. (No model.)

*To all whom it may concern:*

Be it known that I, GEORGE WESTINGHOUSE, Jr., residing at Pittsburg, in the county of Allegheny and State of Pennsylvania, a citizen of the United States, have invented or discovered a certain new and useful Improvement in Means for Detecting and Carrying Off Leakage from Gas-Mains, of which improvement the following is a specification.
In the accompanying drawings, which make part of this specification, Figure 1 is a view, partly in elevation and partly in longitudinal section, of a portion of a gas-main, illustrating the application of my invention; and Fig. 2, a transverse section through the same.

In Letters Patent of the United States No. 306,566, granted and issued to me under date of October 14, 1884, and reissued February 17, 1885, No. 10,561, I have described and claimed a means of detecting and carrying off leakage of gas at the joints of an underground main or pipe line, consisting of a body of loose material—as broken stone or the like—surrounding a joint of the main, and a pipe leading therefrom to a point above the surface of the ground.

The object of my present invention is to further and more perfectly prevent the escape of gas from an underground main into and through the surrounding earth, to facilitate the detection and location of leaks in the main, and to collect for utilization gas leaking therefrom.

To this end my invention, generally stated, consists in the combination of an underground gas main or pipe line having its joints or couplings provided with internal chambers or receptacles adapted to receive gas leaking from the connected pipe-sections, a supplemental line communicating with said joint-chambers, and a detector-line communicating by vent or escape pipes with a series of packing bodies of loose solid material surrounding the upper portion of the main at intervals in its length, and provided with test-pipes adjacent to each of said vent-pipes, and with discharge or waste pipes at suitable intervals.

The improvements claimed are hereinafter fully set forth.

In the practice of my invention each of the joints or couplings of the underground main or pipe line is, as in my Letters Patent No. 319,364, dated June 2, 1885, provided with an internal chamber or receptacle, 7, which has a portion of its walls or boundaries formed by one or both of the sections of pipe connected by the joint in such manner that any gas leaking from either of said sections must pass into and through said chamber to gain egress from the main.

The particular form and location of the chambers 7 is immaterial, so long as they possess the capacity of intercepting leakage, as above indicated, and they may be either of the character illustrated in Letters Patent No. 319,364 or of any other appropriate construction, being, in the instance shown, formed within couplings of the bowl-and-spigot type by the addition of suitable gaskets and packing-rings. Each of the joint-chambers 7 communicates by a connecting-pipe, 10, with a supplemental line, 11, composed of sections of pipe of small diameter relatively to that of the main, and said supplemental line may, according to circumstances, serve as a low-pressure line, from which gas may be delivered for purposes of utilization through service-pipes 34, or, as the case may be, act simply as a leakage-line, provision being made for the escape of the gas, which it receives by pipes leading at proper intervals to points above the level of the ground. The upper portion of the main 1 is surrounded at and for some distance adjacent to its joints or couplings, and at any other points where leakage may be apprehended, by bodies of packing 2, composed of fragments of solid material—as broken stone, coarse gravel, small scrap-metal, or the like—loosely arranged above and around the main, so as to present a series of intercommunicating interstices or spaces throughout the packing 2, which spaces form channels into and through which escaping gas will pass with greater facility than through the surrounding earth.

In practice I find it desirable to cover the bodies of packing with sheets of tar-paper or other material which will prevent the packing from being clogged up with earth. A vent or escape pipe, 5, having, preferably, a flaring or bell-mouthed lower end, is inserted into each of the bodies of packing 2, and leads therefrom into a supplemental line of pipe, 9, laid adjacent to the main 1, said line 9 acting as a detector and escape line to receive the gas which may leak into the several bodies of packing 2, and transmit it to waste or discharge pipes 4, which are connected at proper intervals to the line 9, said pipes having their openings located above the surface of the ground in such positions—as, for example, above lamp-posts, &c.—as to admit of the discharge or ignition of the escaping gas without danger or inconvenience. A series of test-pipes, 6, each closed at top by a removable cap or plug, 8, leads from the detector-line 9 to or near the level of the ground, so as to be accessible therefrom, each of said test-pipes being located adjacent to one of the escape-pipes 5 leading from the packing 2 into the line 9.

Upon the indication of the existence of leakage in the main, by the ignition of gas at either of the waste-pipes 4, the location of the leak, whether at a joint or in the body of the main, may be readily and quickly determined by removing the cap H of one or more of the test-pipes 6 in the vicinity of the waste-pipe, and ascertaining by the nature and extent of the escape of gas therefrom at or near what point of the main the leak exists, thus obviating the delay and expense of excavating at any point in the line other than the location of the leak, and there only for the purpose of making tight a previously-located leak.

By the above construction I provide for the retention and utilization of what may be termed the "preliminary leakage"—that is to say, that which passes from the main into the joint-chambers—and for the prevention of the escape of any secondary or further leakage into the surrounding earth, as well as its ready detection and convenient approximate location.

I claim herein as my invention—

The combination of an underground gas-main having internal chambers or receptacles on its joints or couplings adapted to receive gas leaking from its connected section, a supplemental line communicating with said joint-chambers, a series of bodies of loose packing having intercommunicating recesses inclosing the upper portion of the main at and near its joints, a series of vent or escape pipes, each leading from one of said bodies of packing to a detector and escape line, a waste or discharge pipe leading from said detector-line to a point above the level of the ground, and a series of test-pipes, each leading from the detector-line adjacent to one of the vent or escape pipes to a point at or near the level of the ground, substantially as set forth.

In testimony whereof I have hereunto set my hand.

GEO. WESTINGHOUSE, JR.

Witnesses:
J. SNOWDEN BELL,
R. H. WHITTLESEY.